United States Patent [19]
Ohtomo et al.

[11] 3,973,974
[45] Aug. 10, 1976

[54] ALKALI RESISTANT GLASS COMPOSITIONS AND ALKALI RESISTANT GLASS FIBERS PREPARED THEREFROM

[75] Inventors: Koichiro Ohtomo; Takuji Yoshimura, both of Osaka, Japan

[73] Assignee: Kanebo, Ltd., Tokyo, Japan

[22] Filed: Mar. 18, 1975

[21] Appl. No.: 559,403

[30] Foreign Application Priority Data
Mar. 20, 1974 Japan............................ 49-32279
Oct. 21, 1974 Japan............................ 49-121788

[52] U.S. Cl.................................. 106/50; 106/52; 106/54; 106/99
[51] Int. Cl.² ........................................ C03C 13/00
[58] Field of Search ................. 106/52, 54, 50, 99

[56] References Cited
UNITED STATES PATENTS
3,861,927   1/1975   Kimura et al. ........................ 106/50

Primary Examiner—Helen M. McCarthy
Attorney, Agent, or Firm—Sherman & Shalloway

[57] ABSTRACT

An alkali resistant glass composition comprising

| | |
|---|---|
| SiO | 55 to 69 mol% |
| $ZrO_2$ | 11.5 to 14 mol% |
| $R_2O$ | 12 to 23 mol% |
| $B_2O_3$ | 1 to 6 mol% |
| $P_2O_5$ | 1 to 5 mol% | wherein R represents an alkali metal, the content of R'O, R' being an alkaline earth metal, does not exceed 0.5 mol%, and the content of fluorides, calculated as $F_2$, does not exceed 1 mol%. Alkali resistant fibers prepared from the glass composition, and a cementitious product reinforced with the alkali resistant fibers.

4 Claims, No Drawings

ALKALI RESISTANT GLASS COMPOSITIONS AND ALKALI RESISTANT GLASS FIBERS PREPARED THEREFROM

This invention relates to an alkali resistant glass composition and alkali resistant glass fibers prepared therefrom. The invention also relates to a cementitious product reinforced with the alkali resistant glass fibers.

Glass fibers have found a wide range of utility in fiber-reinforced composite materials such as FRP (Fiber-reinforced plastics) because of their superior tensile strength and very high Young's modulus. With the need for constructing skyscrapers in recent years, it has been strongly desired to render cementitious products lighter and stronger, and various investigations have been undertaken on glass fiber-reinforced cements.

One of the important problems in using glass fibers for reinforcing cement is that since $Ca(OH)_2$ derived from CaO as a consitutent element of cement is dissolved in a cement matrix to saturation, the cement matrix exhibits strong basicity with a pH of as high as 12 to 13. Thus, glass fibers are exposed to an alkaline atmosphere not only during their use as a reinforcing material for cementitious products, but also during their ordinary use for prolonged periods of time. When ordinary so-called E glass fibers are used, the strength of the fibers themselves is reduced drastically, and the fibers cannot fully exhibit their good characteristics as a reinforcing material. It is essential therefore that glass fibers used, for example, for reinforcing cement should have the highest possible alkali resistance.

Glass compositions of various formulations have been known for producing alkali resistant glass fibers. For example, British Pat. No. 1,290,528 discloses that a glass composition comprising, by mol%, 62–75% $SiO_2$, 7–11% $ZrO_2$, 13–23% $Na_2O$ and 1–10% R'O wherein up to 2 mol% of $Na_2O$ can be replaced by $Li_2O$, and R'O is an oxide selected from the group consisting of alkaline earth metal oxides, ZnO and MnO has superior alkali resistance.

Japanese Laid-Open Publication No. 54118/73 discloses that a glass composition comprising, by mol% 67–82% $SiO_2$, 7–10% ZrO, 9–22.5% $Na_2O$, 0–11% R'O and 3–9% $F_2$ wherein up to 5 mol% of $Na_2O$ can be replaced by $Li_2O$ or $K_2O$, and R' has the same significance as mentioned above has a lowered viscosity at its melting temperature because of containing 3 to 9 mol% of $F_2$ and is easy to spin, and that since the glass composition has a relatively high $ZrO_2$ content, alkali resistant glass fibers can be formed from it.

As can be seen from these prior art references, the alkali resistance of glass fiber can be increased by increasing the content of $ZrO_2$ in the glass composition, but with increasing $ZrO_2$ content, the melt viscosity of the glass increases and its liquidus temperature ($T_L$) is also elevated. This not only causes difficulty of a spinning operation, but also gives rise to crystal grains in the spun glass fibers, which in turn causes a reduction in the strength of the fibers.

Generally, glass fibers are produced by continuously spinning glass composition made from a melter made of platinum or a platinum alloy. In order for the melter to be usable over prolonged periods of time, it is advantageous that the spinning temperature should not exceed 1350°C., especially 1320°C. In order to form satisfactory glass fibers, the melt viscosity of the glass composition to be spun through the melter is desirably adjusted to 1000 poises. In the present application, the temperature of the glass composition at which the viscosity of the glass composition is 1000 poises is defined as the spinning temperature ($T_F$).

When a molten glass composition is gradually cooled, crystals are precipitated at a certain temperature. This temperature at which the crystals precipitate is the liquidus temperature ($T_L$) mentioned above.

The spinning temperature ($T_F$) and the liquidus temperature ($T_L$) are inherent to a given formulation of a glass composition. In order, therefore, to form glass fibers of good quality without fiber breakage during spinning, it is necessary to select a glass composition having a formulation with which the spinning temperature ($T_F$) is higher than the liquidus temperature, preferably $T_F - T_L > 50°C$. For ordinary stable operations, it is especially advantageous that $T_F - T_L$ is greater than 80°C.

When further cooled beyond the liquidus temperature, a glass composition of a certain formulation becomes opalescent at a certain temperature. This temperature is called an opalescence temperature ($T_o$). Our investigation has led to the discovery that even a glass composition having an opalescence temperature can be formed into fibers of a uniform texture exhibiting no opalescent phenomenon because the spun glass fibers are quenched, but that when a glass composition having a relatively high opalescence temperature is spun, a glassy phase separation generally occurs in the resulting fibers and sometimes the fibers become opalescent. Desirably, therefore, a glass composition having the lowest possible opalescence temperature is selected in order to obtain glass fibers of good quality.

As stated above, while it has been known previously that glass fibers of increased alkali resistance can be formed by increasing the $ZrO_2$ content of a glass composition, the increase of $ZrO_2$ content results in undesirable tendencies such as a rise in spinning temperature ($T_F$) and liquidus temperature ($T_L$) or the precipitation of crystals. Because of these restrictions, it has been extremely difficult in commercial operations to increase the $ZrO_2$ content to more than 10 mol%, especially to more than 11 mol%.

As a measure for overcoming such difficulties, we previously found that a glass composition comprising, by mol%, 60–67% $SiO_2$, 12–16% $ZrO_2$, 16–20% $Na_2O$, 1–3% R'O, 2–6% $B_2O_3$, 1–3% $P_2O_5$, 0.5–6% $SnO_2$ and 0.5–2% $CaF_2$ wherein R'O is an alkaline earth metal oxide is easy to spin in spite of the $ZrO_2$ content of as high as 12–16 mol%, and gives alkali resistant glass fibers of relatively good quality. This invention was described in co-pending Patent Application (e.g., German Laid-Open Publication 2,323,932 which corresponds to U.S. Pat. No. 3,861,927 to Kinura et al).

The invention of the copending Application is intended to remove the various defects ascribable to the high $ZrO_2$ content by incorporating $P_2O_5$, $B_2O_3$, R'O (especially, CaO) and $CaF_2$. Our further investigations, however, showed that incorporating 1 to 3 mol% of R'O and 0.5 to 2 mol% of $CaF_2$ causes a glassy phase separation in the resulting glass fibers, and as a result, glass fibers of good quality cannot be obtained, and that the incorporation of alkaline earth metal oxides (R'O) increases the liquidus temperature ($T_L$) and the opalescence temperature ($T_o$) and should be avoided as much as possible.

Accordingly, it is an object of this invention to provide a novel glass composition having high alkali resistance and a uniform structure without precipitation of crystals or a glassy phase separation, and novel alkali resistant glass fibers prepared therefrom.

Another object of this invention is to provide glass fibers for reinforcing cement which when dipped in a synthetic cementitious solution, exhibits a reduced loss in weight, and can retain superior strength and Young's modulus over long periods of time; and cementitious products reinforced with these glass fibers.

Still another object of this invention is to provide an alkali resistant glass composition which has a spinning temperature ($T_F$) sufficiently higher than the liquidus temperature ($T_L$) in spite of the very high $ZrO_2$ content and a satisfactorily low opalescence temperature ($T_o$), and can be spun into fibers by a stable spinning operation.

Other objects and advantages of this invention will become apparent from the following description.

The above and other objects and advantages of this invention are achieved by a glass composition comprising the following oxides:

| | |
|---|---|
| $SiO_2$ | 55–69 mol% |
| $ZrO_2$ | 11.5–14 mol% |
| $R_2O$ | 12–23 mol% |
| $B_2O_3$ | 1–6 mol% |
| $P_2O_5$ | 1–5 mol% | wherein R represents an alkali metal, the content of R'O, R' being an alkaline earth metal, does not exceed 0.5 mol%, and the content of fluorides, calculated as $F_2$, does not exceed 1 mol%; and glass fibers consisting essentially of such a composition.

More specifically, the glass compositions and the glass fibers of this invention comprise

| | |
|---|---|
| $SiO_2$ | 55–69 mol% |
| $ZrO_2$ | 11.5–14 mol% |
| $R_2O$ | 12–23 mol% |
| $B_2O_3$ | 1–6 mol% |
| $P_2O_5$ | 1–5 mol% |
| R'O | 0–0.5 mol% |
| $TiO_2$ | 0–3 mol% | wherein R represents an alkali metal, R' represents an alkaline earth metal, and the content of fluorides, calculated as $F_2$, does not exceed 1 mol%.

$Na_2O$ is especially advantageous as $R_2O$ in the above glass composition because it may be obtained a low cost and the meltability of the resulting glass composition is good. But $K_2O$ and $Li_2O$ can also be used. When up to 30 mol%, preferably up to 20 mol%, of $Na_2O$ is replaced by $Li_2O$ and/or $K_2O$, the corrosive attack of refractories during glass formation is reduced or the water durability of the glass composition increases as compared with the case of using $Na_2O$ alone.

In the glass composition of this invention, the content of alkaline earth metal oxides (R'O) should not exceed 0.5 mol%, especially 0.3 mol%. Preferably, this content is as low as possible.

Alkaline earth metal oxides such as CaO or MgO have frequently been incorporated in glass compositions. Especially when as alkali resistant glass composition having a relatively high $ZrO_2$ content is to be produced, alkaline earth metal oxides have previously been considered as almost essential components, because they act as a flux for $ZrO_2$.

However, our investigations have shown that in a system containing 1 to 5 mol% of $P_2O_5$ as in the glass composition of this invention, an alkaline earth metal oxide (R'O) unexpectedly exhibits quite a different behavior than in a system free from $P_2O_5$. For example, when the content of CaO exceeds 0.5 mol%, not only the resulting glass composition itself, but also glass fibers obtained by spinning the molten glass composition and then quenching the fibers obtained, develop a glass phase separation, and that if the content of CaO further increases to, for example, about 2–3 mol%, the glass composition becomes opalescent. The glassy phase separation can be clearly observed by examining the glass composition or glass fibers by means of a transmission electron microscope after treatment with, for example, a 4% aqueous solution of hydrofluoric acid (HF). When a glassy phase separation occurs in the glass compositions and the glass fibers, bot their strength and their alkali resistance over long periods of time are reduced. Accordingly, the amount of R'O must be controlled strictly, and it is very important that the total amount of R'O should not exceed 0.5 mol%, preferably 0.3 mol%.

In the conventional production of glass compositions, not only R'O such as CaO or MgO is used as a raw material, but also calcium fluoride ($CaF_2$) is frequently used as a flux. It is presumed that $CaF_2$ is substantially converted to CaO in glass formation. Thus, in the present invention, the total amount of alkaline earth metal compounds to be converted to R'O after glass formation, calculated as R'O should not exceed 0.5 mol%, preferably 0.3%, based on the entire composition.

In the present invention, $CaF_2$, for example, is dealt with as an $F_2$-generating agent. Various fluorides such as $CaF_2$ or $Na_2SiF_6$ are used as raw materials of glass, and it is known that these flourine components partly volatilize during glass formation. In the present invention, the total amount of all fluorides present in the resulting glass composition after glass formation, calculated as $F_2$, is so controlled that it does not exceed 1 mol%, preferably 0.5 mol%.

Our studies also show that in a system containing both $F_2$ and $P_2O_5$, $F_2$ exhibits a unique behavior. When the $F_2$ content exceeds 1 mol%, a glass phase separation or opalescence tends to occur in the glass composition, and once such a phenomenon has occured, the strength of the glass fibers and their alkali resistance over prolonged periods of time are reduced. For this reason, it is more advantageous to adjust the $F_2$ content to 0.5 mol% or less.

When fluorides are used as glass forming materials, they volatilize at the time of glass formation, and cause environmental pollution. For this reason, too, it is advantageous that the glass compositions of this invention have a very low $F_2$ content.

Furthermore, in the glass composition of this invention, 1 to 6 mol% of $B_2O_3$ is incorporated. It is important that the content of R'O is minimized, and $B_2O_3$ is incorporated in an amount of 1 to 6 mol%, preferably 1 to 4 mol%. If the $B_2O_3$ content is lower than 1 mol%, the melt viscosity of the glass composition rises, and therefore, both the spinning temperature and the liquidus temperature become higher. On the other hand, when the content of $B_2O_3$ exceeds 4 mol%, especially 6 mol%, the alkali resistance of the resulting glass composition is reduced disadvantageously.

$P_2O_5$, which is an important constituent element of the glass compositions and glass fibers of this invention, should be contained in an amount of 1 to 5 mol%, preferably 2 to 4 mol%. By adjusting the $P_2O_5$ content to this range, and controlling the R'O and F₂ contents as mentioned above, the spinning temperature for the glass composition of this invention can be adjusted to a preferred range of about 1,200° to 1,350°C. This also enables the liquidus temperature to become lower than the spinning temperature, and the opalesence temperature to be maintained low. For this reason, the glass composition of this invention can be stably spun without involving fiber breakage, and the resulting glass fibers are homogeneous, and no crystal grains nor glassy phase separation occurs. The glass fibers obtained have high strength and Young's modulus and high alkali resistance.

In particular, the glass fibers of this invention suffer little from a weight loss after being immersed in a synthetic cementitious solution, as will be shown later in the Examples. This fact demonstrates that when the glass fibers of this invention are used as a reinforcement of cement, they have very high durability. We presume that this is because the glass fibers of this invention contains $P_2O_5$ in a proportion of 1 to 5 mol%, preferably 2 to 5 mol%, especially advantagely 2 to 3 mol%, and the $P_2O_5$ forms a certain chemical bond with the Ca component in the cement at the interface between the glass fibers and the cement.

With a system containing $P_2O_5$ in a proportion of as small as 1 to 2 mol%, glass compositions and glass fibers which satisfy $T_F - T_L > 80°C$, although the spinning temperature is as low as 1,290° to 1,330°C. can be formed by adjusting the contents of $Na_2O$ and $SiO_2$ to 17–19 mol% and 64–68 mol%, respectively.

In a preferred aspect, therefore, the present invention provides a glass composition consisting essentially of

| | |
|---|---|
| $SiO_2$ | 59–65 mol% |
| $ZrO_2$ | 12–14 mol% |
| $R_2O$ | 12–23 mol% |
| $B_2O_3$ | 1–4 mol% |
| $P_2O_5$ | 2–5 mol% |
| R'O | 0–0.5 mol% |
| $TiO_2$ | 0–3 mol% | wherein R is an alkali metal and R' is an alkaline earth metal, and the content of fluorides, calculated as $F_2$, does not exceed 1 mol%, especially 0.5 mol%; and glass fibers composed of this glass composition.

A small amount, for example 1 mol%, of $TiO_2$ can be incorporated in the glass composition of this invention. The addition of $TiO_2$ in such an amount does not at all cause any trouble.

It is also permissible that the glass compositions and glass fibers of this invention contain not more than 1 mol%, preferably not more than 0.8 mol%, of metal oxide impurities of the formula $M_xO_y$ wherein M is at least one metal selected from the group consisting of V, Cr, Mn, Fe, Co, Al, Cu, An, As, Y, Mo, Cd, Sn, Sb, Hf and Ce, and $x$ and $y$ are positive integers with the proviso that the valence of M multiplied by $x$ equals 2$y$. These components are contained in the glass composition mostly in the form of oxides, and many of these components are present in the glass composition of this invention as impurities of glass-forming raw materials. The content of these impurities should be as low as possible, but if the total content of the impurities is not in excess of 1 mol%, especially 0.8 mol%, the advantages of the glass compositions and glass fibers of this invention are not seriously affected.

Of the above metal oxide impurities, $Al_2O_3$, $Fe_2O_3$ and $TiO_2$ especially tend to come from the glassforming materials. However, no serious trouble occurs if the total amount of these oxides does not exceed 1 mol%. Since ZnO or MnO as such impurities tends to cause a glassy phase separation in the glass composition of this invention as in the case of R'O, it is advantageous that the total amount of these metal oxide impurities does not exceed 0.5 mol%, especially 0.3 mol%.

Since $CeO_2$ or $As_2O_3$ acts as a glass refining agent, it is usually used in an amount of about 0.2 to 0.3 mol%. Inclusion of such an amount is permissible also in the glass composition of this invention.

According to another preferred aspect, therefore, the present invention provides a glass composition consisting essentially of the following oxides

| | |
|---|---|
| SiO | 59–65 mol% |
| $ZrO_2$ | 12–13 mol% |
| $R_2O$ | 17–22 mol% |
| $B_2O_3$ | 2–4 mol% |
| $P_2O_5$ | 2–3 mol% |
| R'O | 0–0.3 mol% |
| $TiO_2$ | 0–1 mol% |
| $M_xO_y$ | 0–1 mol% | wherein R is an alkali metal; R' is an alkaline earth metal; M is at least one metal selected from the group consisting of V, Cr, Mn, Fe, Co, Al, Cu, Zn, As, Y, Mo, Cd, Sn, Sb, Hf and Ce, and x and y are positive integers with the proviso that the valence of M multiplied by x equals 2 y, and when $M_xO_y$ represent MnO and ZnO, the total amount of $M_xO_y$ and R'O does not exceed 0.5 mol%; and the content of fluorides, calculated as $F_2$, is 0 to 0.5 mol%; and glass fibers consisting of such a composition.

As previously stated, the glass fibers of this invention are especially useful as a reinforcing material for cement. In order to produce glass fiber-reinforced cementitious products, the diameter of each of the fibers is preferably 5 to 50 microns, and the content of the glass fibers in the cementitious products is preferably 0.3 to 25% by weight based on the cement, although they vary according to the use of the cementitious product and the method of fabricating it. If the fiber diameter is smaller than 5 microns, the reinforcing effect is low, and the dispersibility of the fibers becomes poor. On the other hand, if the fiber diameter exceeds 50 microns, the effect of improving the impact strength and bending strength of the reinforced products is reduced, and there is a frequent break of the glass fiber when they are mixed with cement. Accordingly, the preferred diameter of each of the fibers is 7 to 20 microns. If the amount of the glass fibers to be incorporated is less than 0.3% by weight, no sufficient reinforcement can be accomplished. If, on the other hand, it exceeds 25% by weight, the mixed state of the glass fibers becomes non-uniform, and the product becomes rather weaker. Or interspaces occur as a result of interwining of the fibers, and the density and strength of the resulting product are reduced. This is also economically disadvantageous. When the glass fibers are to be incorporated in ordinary mortar or concrete, sufficient reinforcement can be achieved when the amount of the fibers is 0.5 to 20% by weight. Desirably, the fibers are used in an amount of 1 to 15% by weight. When the glass fibers are used instead of asbestos in the field of asbestos cement sheets, their amount is preferably 1 to 20% by weight, especially 5 to 15% by weight. The form of the glass fibers to be incorporated in the cement matrix can be either filaments or staples. Structures of the glass fibers, for example, chopped strands, yarns, tapes, mats, a downy mass, knitted fabrics and woven fabrics, can also be utilized in this invention. Any desired form can be selected according to the utility and the method of fabrication.

Where the glass fibers are used as staples, the suitable fiber length is 1 to 100 mm. If the length is less than 1 mm, the reinforcing effect is extremely poor, and if it exceeds 100 mm, the glass fibers cannot be uniformly dispersed by merely mechanically mixing them with cement mortar. When glass fibers having a fiber length of more than 100 mm are used, they can be aligned in the cement mortar in the form of filaments or their structures such as knitted, woven or nonwoven fabrics.

Reinforced cementitious structures can be produced by a method comprising mixing the cement and the glass fibers in the dry state and then adding water to the mixture, or a method comprising mixing or laminating the glass fibers in or on a cement slurry, or a method involving mixing the glass fibers simultaneously with the molding or cement. The mixture can then be fabricated by any desired method selected according to the purpose of fabrication and the use of the fabricated product, for example, by a die-casting method, a spray method, a spray suction method, an extrusion method, or a sheet-forming method. Curing of the cementitions product can be performed by allowing the product to stand at room temperature, or by using any other desired method such as a centrifugal molding method, a pressurized curing method, or a steamcuring method.

The "cement," as used in this application, denotes an ordinary hydraulic cement represented by Portland cement. When it is made into a cement slurry, the cement means one from which a basic component is generated, for example, Portland cement or calcium silicate. If desired, an aggregate such as sands, stones, or perlite can be incorporated in cement.

Various cementitious products that can be used in this invention cover a wide variety of cementitious products such as press concrete, autoclaved concrete, resin-impregnated cement, light-weight cement, gas concrete, asbestos cement, or asbestos-calcium silicate.

The glass fiber-reinforced cementitions products so obtained in accordance with this invention have high resistance to alkaline aqueous solutions and possess high tensile strength, bending strength and impact resistance over long periods of time without the glass fibers being corroded by basic components in the cement such as calcium hydroxide or without gradually losing their inherent mechanical properties. Accordingly, these cementitious products are useful for various applications, for example, architectural materials such as inner and outer wall panels, ceiling materials, flooring materials or rooftiles of various structures, and civil engineering and garden landscaping materials such as channels, pipes, ground material, or concrete blocks, and show very great commercial values.

The following Examples and Comparative Examples illustrate the present invention in greater detail. The following experimental results, however, are given only to illustrate the invention for easier understanding and are not intended in any way to limit the scope of the invention. The various tests and evaluations made in these experiments were as follows:

Composition of Glass

Unless otherwise specified, the individual components of the glass are expressed by mol%.

Spinnability

A test tube-like mullite melter having an inside diameter of 35 mm and a height of 200 mm with one orifice at its forward end having a diameter of 2 mm is placed in a spinning furnace heated at a predetermined temperature. Then, about 80 g of a sample glass mass is thrown into the melter to melt the glass. The glass is fiberized by taking up the glass extruded from the forward end of the melter at a spinning speed of 1,000 meters/min. The temperature is prescribed so that the diameter of each of the fibers becomes $10\pm1$ microns to $13\pm1$ microns (fiberization temperature). The fiberization temperature is the temperature of the atmosphere inside the spinning furnace at a position 20 mm above the forward end of the melter. The spinnability is evaluated on a scale of excellent, good, fair and poor as follows:

Excellent: No fiber breakage occurs during spinning
Good: Fiber breakage occurs several times during spinning operation for one hour
Fair: Fiber breakage occurs frequently, but fiberization is possible
Poor: No fiberization is possible Spinning Temperature ($T_F$)

About 250 g of a sample glass mass is melted in an alumina crucible at 1,500°C. for 2 hours, and then completely refined. A Pt-Rh (80/20 percent) ball with a diameter of 10 mm hanging from a platinum wire is let fall onto the molten glass, and maintained for 1 hour at a predetermined temperature. After rendering the temperature of the sample molten glass uniform, the ball is taken out. The distance over which the ball is pulled up by the platinum wire is measured by means of a viscosity balance. The above operation is repeated three times, and an average of the three replicates is calculated. The same procedure is repeated with regard to several measuring temperatures, and the temperature-viscosity curve is plotted, and a temperature corresponding to a viscosity of 1,000 poises is read.

Liquidus Temperature ($T_L$) and Opalescence Temperature ($T_o$)

Using a devitrification tester having a platinum plate with a size of 20 × 350 mm and 26 holes having a diameter of 1.5 mm arranged at an interval of 10 mm, a sample glass bead is placed in each of the holes. The platinum plate carrying the glass particles is set in an electric furnace having a temperature gradient of about 300°C. between its center and each of the holes at the ends, and maintained for 2 hours to heat-treat the glass. After the treatment, the glass grains are quenched in the air, and examined by a polarization microscope for devitrified crystals. The maximum temperature at which the crystals are formed is defined as the liquidus temperature ($T_L$).

The maximum temperature at which the glass grains are opalescent and no crystal is formed is defined as the opalescence temperature ($T_o$). This is used as a measure of the glass phase separation of the sample glass.

Glassy Phase Separation

The fractured surface of glass obtained by melting about 100 g of glass in an electric furnace and then allowing it to cool in the air, and the surface of glass fibers taken up at a spinning speed of 1,000 meters/min. are each immersed in a 4% aqueous solution of hydrofluoric acid for 1 minute at room temperature to etch the samples. Each of the etched surfaces is photographed through a transmission electron microscope in accordance with a two-step replica method.

The presence of a fine non-uniform structure and its shape for each sample and the presence of a glassy phase separation are observed from the photographs (10,000 × and 50,000 ×).

COMPARATIVE EXAMPLE 1

This Comparative Example illustrates the relation between the $ZrO_2$ content of a glass composition and its alkali resistance.

A glass batch having each of the various $ZrO_2$ contents as shown in Table 1 was melted in a platinum crucible to vitrify it. The temperature at which the glass was formed is shown in Table 1 as a vitrification temperature. The resulting glass was placed in a mullite ceramic melter with a single hole having a diameter of 2 mm, melted at a predetermined temperature, and fiberized at a take-up velocity of 1,000 m/min. The diameter of the resulting fiber was adjusted to 13 microns (precisely, 13±1 microns; the same will apply hereinafter).

About 2 g of the resulting fiber was precisely weighed, and immersed in 10% aqueous solution of sodium hydroxide with the fiber-to-solution ratio being maintained at 1:50 and treated there at 95°C. for 1 hour. After the treatment, the fiber was washed with 1/10N HCl, washed thoroughly with water, and dried at 120°C. The weight loss was then measured.

It can be seen from Table 1 that with increasing $ZrO_2$ content, the weight loss of the fiber in the 10% aqueous solution of sodium hydroxide is reduced, and the alkali resistance of the fiber increases.

Table 1

| Run No. | 1–1 | 1–2 | 1–3 | 1–4 |
|---|---|---|---|---|
| Composition | | | | |
| $SiO_2$ | 75 | 72.5 | 70 | 67.5 |
| $ZrO_2$ | 5 | 7.5 | 10 | 12.5 |
| $Na_2O$ | 20 | 20 | 20 | 20 |
| Vitrification temperature (°C) | 1350 | 1350 | 1400 | 1400 |
| Fiberization temperature (°C) | 1300 | 1300 | 1330 | 1350 |
| Spinnability | Good | Good | Fair | Fair |
| Alkali resistance (weight loss in wt.% in 10% NaOH) | 12.7 | 6.5 | 3.6 | 2.3 |

COMPARATIVE EXAMPLE 2

This Comparative Example illustrates the properties of a glass composition of a known formulation except an increased $ZrO_2$ content.

Glass compositions having the formulation as shown in Table 2 were prepared and fiberized in the same way as in Comparative Example 1. The various properties as shown in Table 2 were measured. The results are shown in Table 2.

Table 2

| Run No. | 2–1 | 2–2 |
|---|---|---|
| Composition | | |
| $SiO_2$ | 65 | 64.5 |
| $ZrO_2$ | 11 | 12.0 |
| $Na_2O$ | 23 | 21.5 |
| CaO | 1 | — |
| $B_2O_3$ | — | 2.0 |
| Vitrification temperature (°C) | 1400 | 1400 |
| Spinning temperature (°C) | 1248 | 1290 |
| Spinnability | Poor | Fair |
| Crystal grains in the glass fibers | Present | Slightly present |
| Liquidus temperature (°C) | 1327 | 1305 |

The results shown in Table 2 demonstrate that when only the $ZrO_2$ content of a glass composition of a known formulation is increased to 11 mol% and 12 mol%, the liquidus temperature ($T_L$) becomes higher than the spinning temperature ($T_F$), and as a result, crystals precipitate in the resulting glass fibers. For this reason, fiber breakage became frequent during spinning, and the spinning operation became difficult.

COMPARATIVE EXAMPLE 3

Attempts have previously been made to overcome the spinning difficulty ascribable to a high $ZrO_2$ content by incorporating CaO. This Comparative Example is a tracing of the example of Glass No. 68 EF-88 disclosed in British Pat. No. 1,290,528 as one of such attempts.

A glass batch having the formulation shown in Table 3 was vitrified at 1,400°C. in a 70-liter agalmatolite crucible to form glass having a homogeneous quality. Using a 300 cc Pt-Rh melter having 36 tips with a diameter of 2.0 mm made of platinum/rhodium (80/20 percent), the glass was spun at a spinning speed of 1,000 meters/min. using a sizing agent of vinyl acetate type as an oil to form multifilaments each having a diameter of 14 microns.

The resulting multifilaments were immersed in a synthetic cementitious solution (NaOH; 0.88 g/liter, KOH: 3.45 g/liter, Ca(OH)$_2$: 0.48 g/liter) at 80°C., and treated for 200 hours. The retention of the strength of the glass filaments was measured.

In order to determine the alkali resistance of the glass fibers, the above procedure was repeated except that the sizing agent was not used. The resulting multifilaments each having a diameter of 14 microns were treated respectively with a 10% aqueous solution of sodium hydroxide at 95°C. for 1 hour, or with a synthetic cementitious solution at 80°C. for 200 hours. The weight loss of the fibers was measured. The results are shown in Table 3.

Table 3

| Run No. | 3–1 |
|---|---|
| Composition | |
| $SiO_2$ | 67 |
| $ZrO_2$ | 9.5 |
| $Na_2O$ | 17.5 |
| CaO | 6.0 |
| Vitrification temperature (°C) | 1400 |
| Liquidus temperature (°C) | 1245 |
| Spinning temperature (°X) | 1291 |
| Weight loss (wt.%) | |
| In 10% NaOH | 1.33 |
| In synthetic cementitious | |

Table 3-continued

| Run No. | 3-1 |
| --- | --- |
| solution | 1.14 |
| Strength of the fibers | |
| Non-treated fibers (Kg/mm²) | 189 |
| Fibers treated with the synthetic cementitious solution (Kg/mm²) | 79 |
| Strength retention after treatment with the synthetic cementitious solution (%) | 41.8 |

It can be seen from Table 3 that the weight loss of the glass fibers treated with 10% NaOH is small, but after treatment with the synthetic cementitious solution, the retention of the strength is low (about 42%).

COMPARATIVE EXAMPLE 4

This Comparative Example is a tracing of a conventional process in which $F_2$ is added in order to improve the spinnability of a glass composition having a relatively high $ZrO_2$ content.

Glass compositions having formulations 68 EF-216 and 68 EF-218 disclosed in Japanese Laid-Open Publication No. 54118/73 were prepared under the same conditions as in Comparative Example 1. Both glass compositions were seen to become opalescent as shown in Table 4.

Table 4

| Run No. | 4-1 | 4-2 |
| --- | --- | --- |
| Composition | | |
| $SiO_2$ | 82 | 69 |
| $ZrO_2$ | 7 | 8.5 |
| $Na_2O$ | 11 | 22.5 |
| $F_2$ | 9 | 5 |
| Vitrification temperature (°C) | 1400°C. | 1400°C. |
| Property of glass mass | opalescent | opalescent |

EXAMPLE 1

In this Example, the properties of glass compositions containing 12 mol% of $ZrO_2$ and varying proportions of $P_2O_5$ (one of them being a comparison) were measured.

Glass compositions described in Table 5 were produced and fiberized in accordance with the conditions of Comparative Example 1 to form glass fibers having a diameter of 13 microns. The glass fibers obtained were observed for crystal grains.

The liquidus temperature of the glass was measured, and its relation with the spinning temperature (the temperature at which the viscosity is 1,000 poises) was examined. The results are shown in Table 5.

It is seen from Table 5 that by adding $P_2O_5$ in an amount of at least 1 mol%, preferably at least 1.5 mol%, the liquidus temperature can be lowered. As a result, even when the $ZrO_2$ content is maintained at more than 11.5 mol% in accordance with this invention, the resulting glass composition is spinnable.

Table 5

| Run No. | | 5-1 | 5-2 | 5-3 | 5-4 | 5-5 | 5-6 |
| --- | --- | --- | --- | --- | --- | --- | --- |
| Composition | | | | | | | |
| $SiO_2$ | | 64.5 | 63.5 | 62.5 | 61.5 | 59.5 | 58.5 |
| $ZrO_2$ | | 12 | 12 | 12 | 12 | 12 | 12 |
| $Na_2O$ | | 21.5 | 21.5 | 21.5 | 21.5 | 21.5 | 21.5 |
| $B_2O_3$ | | 2 | 2 | 2 | 2 | 2 | 2 |
| $P_2O_5$ | | 0 | 1 | 2 | 3 | 5 | 6 |
| Vitrification temperature (°C) | | 1400 | 1400 | 1350 | 1350 | 1350 | 1350 |
| Liquidus temperature (°C) | | 1306 | 1285 | 1240 | 1175 | 1064 | 1011 |
| Spinning temperature (°C) | | 1292 | 1290 | 1288 | 1275 | 1226 | 1164 |
| Spinnability | | Poor | Fair | Good | Excellent | Excellent | Excellent |
| Crystal grains in the fibers | | Present | Present somewhat | None | None | None | None |
| Alkali resistance (weight loss) | in 10% NaOH | | 1.64 | 1.83 | 2.31 | 2.76 | 2.91 |
| | in synthetic cementitious solution | | 0.44 | 0.62 | 0.72 | 0.95 | 1.05 |

EXAMPLE 2

In this Example, the properties of glass compositions having a $ZrO_2$ content of 11.7 to 12.0 mol% and varying contents of CaO in the co-presence of $P_2O_5$ (some of which are comparisons) were measured.

Glass compositions described in Table 6 were produced in accordance with the conditions of the Comparative Example 1, and the spinning temperature, the liquidus temperature and the opalescence temperature were measured. The glass mass was further treated with hydrofluoric acid, and then examined for glassy phase separation by means of an electron microscopic photograph.

Each of the glass compositions was fiberized at a predetermined temperature, treated similarly with hydrofluoric acid, and then examined for glassy phase separation by means of an electron microscopic photograph.

The results obtained are shown in Table 6.

Table 6

| Run No. | 6-1 | 6-2 | 6-3 (comparison) | 6-4 (comparison) | 6-5 (comparison) | 6-6 (comparison) |
| --- | --- | --- | --- | --- | --- | --- |
| Composition | | | | | | |
| $SiO_2$ | 61.5 | 61.2 | 60.9 | 60.3 | 59.7 | 60.5 |
| $ZrO_2$ | 12.0 | 11.9 | 11.9 | 11.8 | 11.7 | 12 |
| $Na_2O$ | 21.5 | 21.4 | 21.3 | 21.1 | 20.9 | 21.5 |
| $B_2O_3$ | 2.0 | 2.0 | 2.0 | 2.0 | 1.9 | 2 |
| $P_2O_5$ | 3.0 | 3.0 | 3.0 | 2.9 | 2.9 | 1 |
| CaO | 0 | 0.5 | 1.0 | 2.0 | 3.0 | 2 |

Table 6-continued

| Run No. | 6-1 | 6-2 | 6-3 (comparison) | 6-4 (comparison) | 6-5 (comparison) | 6-6 (comparison) |
|---|---|---|---|---|---|---|
| $CaF_2$ | | | | | | 1 |
| Vitrification temperature (°C) | 1350 | 1350 | 1350 | 1350 | 1350 | 1350 |
| Liquidus temperature (°C) | 1165 | 1190 | 1188 | 1228 | 1150 | 1315 |
| Opalesence temperature (°C) | 950 | 1015 | 1052 | 1105 | 1157 | — |
| Glass  Opalesence | None | None | None | None | Present | None |
| Glassy phase separation | None | Present | Present | Present | Present | Present |
| Spinning  Spinning temperature (°C) | 1275 | 1273 | 1269 | 1265 | 1283 | 1325 |
| Spinnability | Excellent | Excellent | Excellent | Excellent | Excellent | Good |
| Crystal grains in the fibers | None | None | None | None | None | Present |
| Glass phase separation of fibers | None | Present | Present | Present | Present | None |

It is seen from the results shown in Table 6 that the increase of the CaO content elevates the liquidus temperature of the resulting glass composition, and does not lower the spinning temperature, and therefore, the difference between these temperatures is narrowed and the spinnability becomes worse. It can also be understood that the opalesence temperature rises abruptly to increase the tendency of the glass compositions and the glass fibers to develop a glassy phase separation. These results substantiate that the CaO content should not exceed 0.5 mol%, and preferably it should be substantially near zero.

EXAMPLE 3

In this Example, glass compositions comprising 12 mol% of $ZrO_2$, 3 mol% of $P_2O_5$ and 0 to 7 mol% of $B_2O_3$ and glass fibers obtained from these compositions were tested for their properties.

Glass compositions shown in Table 7 were produced in accordance with the conditions of Comparative Example 1, and spun at a spinning speed of 1000 meters/min. to afford fibers having a diameter of 13 microns. The alkali resistance of the fibers in a 10% aqueous solution of sodium hydroxide was also measured.

The results are shown in Table 7.

however, the alkali resistance of the resulting glass fibers is gradually reduced. Accordingly, the amount of $B_2O_3$ must be adjusted to below 6 mol%.

EXAMPLE 4

This Example is a typical embodiment in accordance with this invention.

Glass materials were uniformly mixed at predetermined proportions, and thrown into an agalmatolite crucible (of the $SiO_2-Al_2O_3$ type) baked for 24 hours at 1,500°C. then, the materials were heated at 1,350°C. for 40 hours to form a glass composition of homogeneous quality. A rod having a diameter of 8 mm and a length of 50 mm was produced from the glass composition.

Then, the glass rod was melted at 1,290°C. in a platinum-rhodium (80/20 percent) melter having an inner capacity of about 1.9 liters and containing 204 with a diameter of 2.0 mm. The melting temperature was measured at a position 10 mm above the base plate of the melter.

The glass was spun at a spinning speed of 1,000 meters/min. using an oiling device of an apron type and an emulsion containing 15% by weight of a vinyl acetate polymer as a sizing agent, and then wound up on a

Table 7

| Run No. | | 7-1 (comparison) | 7-2 | 7-3 | 7-4 | 7-5 | 7-6 (comparison) |
|---|---|---|---|---|---|---|---|
| Composition | | | | | | | |
| $SiO_2$ | | 63.5 | 62.5 | 60.5 | 58.5 | 57.5 | 56.5 |
| $ZrO_2$ | | 12 | 12 | 12 | 12 | 12 | 12 |
| $Na_2O$ | | 21.5 | 21.5 | 21.5 | 21.5 | 21.5 | 21.5 |
| $B_2O_3$ | | 0 | 1 | 3 | 5 | 6 | 7 |
| $P_2O_5$ | | 3 | 3 | 3 | 3 | 3 | 3 |
| Vitrification temperature (°C) | | 1400 | 1400 | 1350 | 1350 | 1350 | 1350 |
| Liquidus temperature (°C) | | 1321 | 1250 | 1162 | 1127 | 1106 | 1092 |
| Spinnability  Spinning temperatures (°C) | | 1313 | 1291 | 1251 | 1213 | 1208 | 1191 |
| Spinnability | | Poor | Good | Excellent | Excellent | Excellent | Excellent |
| Crystal grains in the fibers | | Present | None | None | None | None | None |
| Alkali resistance (%, weight loss) | in 10% NaOH | | 2.28 | 2.37 | 2.47 | 2.85 | 4.11 |
| | in synthetic cementitious soluton | | | 0.67 | | | |

It can be seen from Table 7 that with increasing $B_2O_3$ content, both the liquidus temperature and the spinning temperature are lowered, and thus, the spinnability is improved. In addition, since the difference between these temperatures becomes larger, the spinnability is more stabilized. With increasing $B_2O_3$ content, paper bobbin. The average diameter of the resulting fibers was 13.9 microns.

The properties of the resulting glass composition and the fibers were measured, and the results are shown in Table 8.

For comparison, the properties of E glass fibers (10.6 microns x 204) are also shown in Table 8 (Run No. 8-2).

Table 8

| Run No. | 8-1 | 8-2 (comparison) |
|---|---|---|
| Composition | | |
| $SiO_2$ | 61.5 | |
| $ZrO_2$ | 12.0 | |
| $Na_2O$ | 21.5 | |
| $B_2O_3$ | 2 | |
| $P_2O_5$ | 3 | |
| Vitrification temperature (°C) | 1350 | |
| Liquidus temperature (°C) | 1165 | 1060 |
| Spinning temperature (°C) | 1275 | 1210 |
| Take-up velocity (m/min.) | 1000 | |
| alkali resistance (Weight loss %) in 10% NaOH | 2.31 | 11.9 |

Table 8-continued

| Run No. | 8-1 | 8-2 (comparison) |
|---|---|---|
| in synthetic solution | | |

EXAMPLE 5

Glass batches of the formulations shown in Table 9 were each melted to form glasses. Each of the glasses obtained was placed in a mullite heat-resistant ceramic melter with 36 spinning holes each having a diameter of 2 mm, and fiberized at a predetermined temperature at a wind-up velocity of 1000 m/min. to afford fibers having a diameter of 10±0.1 microns.

The results obtained are shown in Table 9.

Table 9

| Run No. | 9-1 | 9-2 | 9-3 | 9-4 | 9-5 (comparison) | 9-6 | 9-7 | 9-8 | 9-9 | 9-10 | 9-11 |
|---|---|---|---|---|---|---|---|---|---|---|---|
| Composition | | | | | | | | | | | |
| $SiO_2$ | 61.5 | 60.5 | 59.5 | 58.5 | 57.5 | 59.5 | 59.5 | 59.5 | 58.5 | 59.0 | 61 |
| $ZrO_2$ | 12 | 12 | 13 | 14 | 15 | 12 | 12 | 12 | 12 | 12.0 | 12 |
| $Na_2O$ | 21.5 | 21.5 | 20.5 | 19.5 | 19.5 | 21.5 | 21.5 | 19.5 | 21.5 | 21.0 | 21 |
| $Li_2O$ | — | — | — | — | — | — | — | — | — | — | — |
| $K_2O$ | — | — | — | — | — | — | — | — | — | — | — |
| $B_2O_3$ | 2 | 2 | 4 | 5 | 5 | 3.0 | 2.0 | 4.0 | 2.0 | 3.0 | 3 |
| $P_2O_5$ | 3 | 4 | 3 | 3 | 3 | 2.0 | 3.0 | 3.0 | 4.0 | 3.0 | 3 |
| $TiO_2$ | — | — | — | — | — | 2.0 | 2.0 | 2.0 | 2.0 | 2.0 | — |
| $F_2$ | — | — | — | — | — | — | — | — | 1 | — | 0.5 |
| Vitrification temperature (°C) | 1350 | 1350 | 1390 | 1420 | 1580 | 1400 | 1350 | 1350 | 1350 | 1350 | 1400 |
| Fiberization temperature (°C) | 1280 | 1280 | 1280 | 1260 | 1300 | 1300 | 1280 | 1280 | 1280 | 1300 | 1 × 90 |
| Spinning speed (m/min.) | 1000 | 1000 | 1000 | 1000 | 1000 | 1000 | 1000 | 1000 | 1000 | 1000 | 1500 |
| Spinnability | Excellent | Excellent | Good | Good | Poor | Good | Excellent | Excellent | Excellent | Excellent | Good |
| Young's Modulus ($Kg/mm^2$) | 8070 | | | 8246 | | | | | | 8105 | |
| Alkali resistance (weight loss, %) in 10% NaOH | 2.3 | 2.8 | 2.2 | 1.8 | 2.9 | 2.1 | 1.9 | 2.3 | 2.4 | 2.7 | 2.9 |
| in synthetic cementitious solution | 0.81 | | 0.82 | 0.57 | | 0.87 | | 0.89 | | | 0.75 |
| Fiber Quality ($Kg/mm^2$) cementitious solution | 0.70 | | | | | | | | | | |
| Non-treated fibers ($Kg/mm^2$) | 190 | | | 208 | | | | | | | |
| Treated fibers ($Kg/mm^2$) | 137 | | | 17.7 | | | | | | | |
| Strength retention (%) in synthetic cementitious | 70.3% | | | 8.5 | | | | | | | |

EXAMPLE 6

In this Example, glass compositions of various formulations were prepared, and fiberized under the same conditions as in Comparative Example 1 to form fibers having a diameter of 13±1 microns which were wound up at a spinning speed of 1,000 meters/min.

The properties of the glass compositions and the properties of the fibers including their alkali resistance were measured, and the results obtained are shown in Table 10.

Table 10

| Run No. | 10-1 (comparison) | 10-2 | 10-3 (comparison) | 10-4 (comparison) | 10-5 | 10-6 | 10-7 |
|---|---|---|---|---|---|---|---|
| Composition | | | | | | | |
| $SiO_2$ | 63.5 | 59.5 | 58.5 | 54 | 65 | 59.5 | 61.5 |
| $ZrO_2$ | 10 | 14 | 15 | 12.5 | 12.5 | 12 | 12 |
| $Na_2O$ | 21.5 | 21.5 | 21.5 | 24 | 18 | 21.5 | 17.5 |
| $Li_2O$ | — | — | — | — | — | — | 2 |
| $K_2O$ | — | — | — | — | — | — | 2 |
| $B_2O_3$ | 2 | 2 | 2 | 5 | 2 | 2 | 2 |
| $P_2O_5$ | 3 | 3 | 3 | 4.5 | 2.5 | 3 | 3 |
| $TiO_2$ | — | — | — | — | — | 2 | — |
| $F_2$ | — | — | — | — | — | — | — |

Table 10-continued

| | | | | | | | | |
|---|---|---|---|---|---|---|---|---|
| Vitrification temperature (°C) | 1350 | 1400 | 1400 | 1300 | 1500 | 1350 | 1350 | |
| Liquidus temperature (°C) | 1007 | 1258 | 1304 | 1210 | 1163 | 1225 | 1165 | |
| Spinning temperature (°C) | 1265 | 1294 | 1301 | 1182 | 1323 | 1265 | 1278 | |
| Spinnability | Excellent | Good | Poor | Poor | Excellent | Excellent | Excellent | |
| Crystal grains in the fibers | none | none | | | none | none | none | |
| Alkali resistance (weight loss, %) in 10 % NaOH | 3.64 | 1.64 | | | 2.52 | 2.21 | 2.38 | |
| in Synthetic cementitious solution | 1.53 | 0.51 | | | 0.62 | 0.66 | | |
| Strength (Kg/mm²) | | | | | | | 195 | |

| Run No. | 10-8 | 10-9 (comparison) | 10-10 (comparison) | 10-11 | 10-12 | 10-13 | 10-14 | 10-15 |
|---|---|---|---|---|---|---|---|---|
| Composition | | | | | | | | |
| SiO₂ | 61.5 | 61.5 | 56.5 | 66.5 | 65 | 63 | 64.5 | 65 |
| ZrO₂ | 12 | 12 | 12 | 12 | 12.5 | 12 | 12 | 13 |
| Na₂O | 21.5 | 21.5 | 21.5 | 18 | 17 | 22 | 18.5 | 16.5 |
| Li₂O | — | — | — | 1 | 2 | — | 0.5 | 2 |
| K₂O | — | — | — | — | 1 | — | 0.5 | — |
| B₂O₃ | 2 | 2 | 2 | 1.5 | 1 | 1.5 | 2 | 1.5 |
| P₂O₅ | 3 | 3 | 3 | 1 | 1.5 | 1.5 | 2 | 2 |
| TiO₂ | — | — | 5 | — | — | — | — | — |
| F₂ | 1 | 3 | — | — | — | — | — | — |
| Vitrification temperature (°C) | 1350 | 1350 | 1350 | 1400 | 1400 | 1400 | 1400 | 1450 |
| Liquidus temperature (°C) | 1166 | 1145 | | 1210 | 1263 | 1261 | 1195 | 1275 |
| Spinning temperature (°C) | 1265 | 1235 | | 1315 | 1320 | 1305 | 1280 | 1335 |
| Spinnability | Excellent | Excellent | Excellent | Excellent | Excellent | Good | Excellent | Excellent |
| Crystal grains in the fibers | none | none | none | none | none | none | none | none |
| Alkali resistance (weight loss, %) in 10% NaOH | 2.50 | | 3.94 | 1.70 | 1.81 | 1.65 | 2.12 | 1.90 |
| in synthetic cementitious solution | 0.67 | | | 0.57 | | | 0.65 | 0.45 |
| Strength (Kg/mm²) | 180 | 165 | | | | | | |

As is demonstrated in the Examples of this invention shown in Tables 6 to 10, the glass compositions and the glass fibers of this invention have the following advantages.

1. They have very high alkali resistance. In particular, they exhibit a reduced loss of weight in a synthetic cementitious solution (containing Ca), and therefore have durability.

2. They have high strength and Young's modulus, and very high strength retention after treatment with a synthetic cementitious solution as compared with the conventional products (for example, compare Run No. 8-1 in Table 8 with Run No. 3-1 in Table 3).

3. There is preferable difference between the spinning temperature and the liquidus temperature, and the glass compositions can be spun in good condition. Fiber production can thus be performed stably on a commercial scale.

4. The glass fibers have a uniform texture (free from crystal grains or glassy phase separation).

The glass fibers of this invention also have very superior alkali resistance when exposed to an alkaline system in which a Ca ion is co-present. For example, in Run No. 8-1 shown in Table 8, when a large excess of Ca(OH)₂ was added to a 10% aqueous solution of sodium hydroxide, and the glass fibers were treated by the same method at 95°C. for 1 hour, the weight loss of the fibers was 1.8% by weight. This evidently shows a reduction in weight loss as compared with the case of treating the fibers with a 10% aqueous solution of sodium hydroxide. The glass fibers of this invention, therefore, are very suitable as a reinforcement of cement matrix.

What we claim is:

1. An alkali resistant glass fiber comprising a glass fiber having a diameter of 5 to 50 microns and a glass composition consisting essentially of

| | |
|---|---|
| SiO₂ | 55 to 69 mol% |
| ZrO₂ | 11.5 to 14 mol% |
| R₂O | 12 to 23 mol% |
| B₂O₃ | 1 to 6 mol% |
| P₂O₅ | 1 to 5 mol% |
| R'O | 0 to 0.3 mol% |
| TiO₂ | 0 to 1 mol% |
| M$_x$O$_y$ | 0 to 1 mol% | wherein R is an alkali metal, R' is an alkaline earth metal, M$_x$O$_y$ represents metal oxide impurities, wherein M is at least one metal selected from the group consisting of V, Cr, Mn, Fe, Co, Al, Cu, Zn, As, Y, Mo, Cd, Sn, Sb, Hf and Ce, x and y are positive integers with the proviso that the valence of M multiplied by x equals 2y, and when M$_x$O$_y$ is MnO or ZnO, the total content of M$_x$O$_y$ and R'O does not exceed 0.5 mol%, and the content of fluorides, calculated as F₂, does not exceed 0.5 mol%, said glass composition being such that the liquidus temperature ($T_L$) is more than 50°C. below the spinning temperature ($T_F$) at which the glass viscosity is 1,000 poises, said spinning temperature ($T_F$) being not higher than 1,320°C.

2. The alkali resistant glass fiber according to claim 1 wherein said glass composition consists essentially of

| | |
|---|---|
| $SiO_2$ | 59 to 65 mol% |
| $ZrO_2$ | 12 to 13 mol% |
| $R_2O$ | 17 to 22 mol% |
| $B_2O_3$ | 2 to 4 mol% |
| $P_2O_5$ | 2 to 3 mol% |
| R'O | 0 to 0.3 mol% |
| $TiO_2$ | 0 to 1 mol% |
| $M_xO_y$ | 0 to 1 mol%. |

3. The alkali resistant glass fiber of claim 1 wherein the difference between the spinning temperature ($T_F$) and the liquidus temperature ($T_L$) is greater than 80°C.

4. The alkali resistant fiber of claim 1 which is substantially totally devoid of alkaline earth metal oxides and fluorine containing compounds.

* * * * *